(12) United States Patent
Shimajiri

(10) Patent No.: US 6,575,542 B2
(45) Date of Patent: Jun. 10, 2003

(54) WITHDRAWAL MECHANISM AND CUP-HOLDER UNIT USING THE SAME

(75) Inventor: Naohiro Shimajiri, Toyota (JP)

(73) Assignee: Nifco Inc., Yokohama (JP)

( * ) Notice: Subject to any disclaimer, the term of this patent is extended or adjusted under 35 U.S.C. 154(b) by 91 days.

(21) Appl. No.: 09/946,540

(22) Filed: Sep. 6, 2001

(65) Prior Publication Data

US 2002/0033656 A1 Mar. 21, 2002

(30) Foreign Application Priority Data

Sep. 21, 2000 (JP) ........................................ 2000-287632

(51) Int. Cl.[7] ............................................... A47B 95/00
(52) U.S. Cl. ..................... 312/332; 248/311.2; 224/281
(58) Field of Search ................. 312/309, 332, 312/333, 334.44, 334.46; 297/188.07, 188.17, 188.11; 708/25, 44, 45; 248/311.2; 224/281, 282, 926

(56) References Cited

U.S. PATENT DOCUMENTS

| 5,060,899 A | * | 10/1991 | Lorence et al. ........ 297/188.17 |
| 5,427,447 A | | 6/1995 | Satoh |
| 5,618,018 A | * | 4/1997 | Baniak ..................... 248/311.2 |
| 5,803,421 A | * | 9/1998 | Kerner et al. ............. 248/311.2 |
| 5,899,426 A | * | 5/1999 | Gross et al. ............. 248/311.2 |
| 5,941,491 A | * | 8/1999 | Plocher et al. .......... 297/188.17 |
| 5,944,240 A | * | 8/1999 | Honma ......................... 224/281 |
| 6,409,061 B1 | * | 6/2002 | Fischer et al. ........... 248/311.2 |
| 6,450,468 B1 | * | 9/2002 | Hamamoto .............. 248/311.2 |

FOREIGN PATENT DOCUMENTS

| JP | 3-167037 | | 7/1991 | |
| JP | 06001178 | * | 1/1994 | .............. 248/311.2 |
| JP | 06001179 | * | 1/1994 | .............. 248/311.2 |

* cited by examiner

Primary Examiner—Lanna Mai
Assistant Examiner—Hanh V. Tran
(74) Attorney, Agent, or Firm—Kanesaka & Takeuchi

(57) ABSTRACT

A withdrawal mechanism is structured such that a first guiding projection and a second guiding projection provided at a holder member are slidably inserted into a first guiding groove and a second guiding groove having an inclined portion formed on a housing. When the second guiding projection is guided at the inclined portion of the second guiding groove, the holder member is rotated around the first guiding projection by a predetermined angle. Thus, the holder member is drawn from a front opening of the housing in a state rotated by a predetermined angle.

10 Claims, 8 Drawing Sheets

WITHDRAWAL MECHANISM AND CUP-HOLDER UNIT USING THE SAME

BACKGROUND OF THE INVENTION AND RELATED ART STATEMENT

The invention relates to a withdrawal mechanism suitable for a cup-holder unit or the like as an automobile interior equipment, and the cup-holder unit using the same.

Heretofore, a cup holder for holding a cup for a beverage or canned beverage has been installed in a central console or an instrument panel of a vehicle. In this case, in order to effectively use a narrow space in a compartment of the vehicle, there has been known a drawer-type cup holder, wherein a housing is built in an interior wall of the vehicle and the cup holder can be drawn out of the housing at any time.

In case the drawer-type cup holder as described above is built in the instrument panel of the vehicle, there may be a case such that a shift lever or an arm rest becomes an obstacle or drawing the holder depending on an installation position thereof. Therefore, in order to draw the holder while avoiding from the obstacle, it has been proposed that the drawn-out holder can swing or a drawing locus of the holder is inclined on one side. Also, it has been proposed that by considering the using condition of the user, the holder is designed to be drawn on the side of a driver's seat depending on the installation position.

For example, in Japanese Patent Publication (KOKAI) No. 3-167037, as shown in FIG. 7, there has been proposed a cup holder, wherein sliding grooves b are provided in upper and lower walls of a housing a in the front-and-rear directions thereof, and also, sliding projections d slidably inserted into the sliding grooves b are provided to the holders c to thereby move the holders c along the sliding grooves b, so that under the state wherein the holders c are drawn out of the housing a, the holders c can swing around the sliding projections d, respectively.

However, in the cup holder, since the holders c in the drawn-out state from the housing a are swingable, they are likely to swing in the horizontal direction even with cups thereon, so that the stability at the time of use is not sufficient since shaking and vibration take place always in the vehicle. In this case, although it is possible to provide a locking device for locking the holders c in a state where they swing with a predetermined angle, in case the locking device as described above is provided, the number of parts of the cup holder is increased and the assembling work thereof becomes complicated, which results in a high cost.

Also, as shown in FIGS. 8(A) and 8(B), there has been proposed a cup holder, wherein a sliding guide member e slidable in the front-and-rear directions and a guiding groove b, the forward end of which is inclined on one side, are provided in the housing a, and a holder c is provided with a first guide projection d to be inserted into the guiding groove b and a second guide projection g to be inserted into a sliding guide groove f provided in the sliding guide member e, so that the holder c is drawn from the housing a while sliding to one side. More specifically, as shown in FIG. 8(B), when the holder c is drawn from the housing a, the sliding guide member e is also moved forward together with the holder c to guide the first guide projection d provided on the holder c to the inclined portion of the guide groove b, and also, the second guide projection g is guided along the sliding groove f of the sliding member e, so that the holder c is drawn in a state sliding on one side.

In the cup holder, the holder can be held in a relatively stable state when it is drawn from the housing a, so that the problem resulted from the cup holder as shown in FIG. 7 can be solved. However, the cup holder requires the sliding member e, so that the number of parts is increased. Also, the sliding member e and the holder c have to be built in the housing a in an interlocked state, which results in complicated assembling work and decreases in the assembling efficiency, i.e. production efficiency to thereby raise its cost.

In view of the above defects, the present invention has been made and an object of the invention is to provide a withdrawal mechanism, wherein a drawing member of a holder for holding a cup or the like is drawn by sliding to one side, the drawn drawing member can be held in a stable state and an assembling work thereof can be easily carried out with the less number of parts to thereby reduce its cost.

Another object of the invention is to provide a cup-holder unit using the withdrawal mechanism as stated above.

Further objects and advantages of the invention will be apparent from the following description of the invention.

SUMMARY OF THE INVENTION

In order to attain the above objects, according to one aspect of the invention, a withdrawal mechanism of the present invention includes a box-shape housing having an opening at a front end thereof and a drawing member received in the housing to be slidable in the front-and-rear directions thereof. When the drawing member is slidably drawn forward, the drawing member projects forward from the front end of the housing. A first linear guiding groove and a second guiding groove having an inclined portion inclined to one side at at least a portion thereof are provided, side by side in the front-and-rear directions, to the housing or the drawing member. A first guiding projection to be slidably inserted into the first guiding groove and a second guiding projection to be slidably inserted into the second guiding groove are provided to the drawing member or housing. When the drawing member is drawn, the first and second guiding projections slide in the first and second guiding grooves, respectively. When the second guiding projection slides through the inclined portion of the second guiding groove, the drawing member is drawn while rotating around the first guiding projection, and the drawing member projects from the front end of the housing in a state swinging by a predetermined angle.

According to a second aspect of the invention, in a cup-holder unit, a mechanism for holding a cup or the like and a holder member received in the housing to be slidable in the front-and-rear directions thereof are provided. When used, the holder member is pulled forward to be drawn from the housing, so that the holder member projects forward from the front end surface of the housing. The withdrawal mechanism is provided between the housing and the holder member.

In the withdrawal mechanism of the invention, as described above, the first guiding projection and the second guiding projection formed on one of the housing and the drawing member are inserted into the first linear guiding groove and the second guiding groove formed on the other of the housing and the drawing to be slidable therein. When the drawing member is drawn from the housing, the first and second guiding projections slid in the first and second guiding grooves. At this time, when the second guiding projection is guided to the inclined portion of the second guiding groove, the drawing member is rotated by a predetermined angle around the first guiding projection, so that the drawing member is drawn from the front end surface of the housing in a state rotated by a predetermined angle.

As described above, according to the withdrawal mechanism of the invention, the swinging angle of the drawing member is controlled by two engaging points, i.e. an engaging point between the first guiding projection and the first guiding groove and an engaging point between the second guiding projection and the second guiding groove. Thus, the swinging angle of the drawing member drawn from the front end surface of the housing is stably held at a predetermined angle to thereby cause no horizontal shaking nor wobbling.

Moreover, only the first and second guiding grooves and the first and second guiding projections are provided to the housing and the drawing member, respectively. And, there is no necessity of providing the sliding guide member e required by the cup holder shown in FIGS. 8(A) and 8(B), nor a locking mechanism for locking the drawing member with a predetermined swinging angle. Thus, the withdrawal mechanism of the invention can be structured with less number of parts, and moreover, the assembly work can be easily carried out only by the simple work such that the drawing member is set in the housing so that the first and second guiding projections are engaged with the first and second guiding grooves to thereby reduce working steps when assembled and to effectively carry out the assembling work. Thus, the production cost can be effectively reduced.

Here, though it is not specially limited, it is preferable that the sliding grooves are provided to the inner surfaces of both side walls of the housing or both side surfaces of the drawing member in the front-and-rear directions thereof, and sliding projections to be inserted into the sliding grooves are slidably provided to the inner surfaces of both side walls of the housing or both side surfaces of the drawing member. A curved portion or inclined portion corresponding to the rotating movement of the drawing member is provided to at least a portion of the sliding groove or sliding projection formed on the drawing member, so that when the drawing member is drawn from the housing or housed in the housing, the sliding projections are slidably moved in the sliding grooves.

Thus, the vertical wobbling of the drawing member can be positively avoided to thereby further improve the using state of the drawing member which is drawn from the housing. Also, since the curved portion or the inclined portion corresponding to the rotating movement of the drawing member is provided at at least a portion of the sliding groove or sliding projection formed on the drawing member, at least a portion of the sliding projection is always inserted into the sliding groove while the drawing member is completely drawn from its housed state or the drawing member is completely housed from its drawn state. Thus, when the drawing member is drawn or housed, no vertical wobbling occurs to thereby carry out an extremely stable drawing operation or housing operation.

Further, though it is not specially limited, it is preferable that the first and second guiding grooves are open at the front end of the housing or at the rear end of the drawing member, so that the drawing member can be easily assembled to the housing to thereby simplify the assembly work.

More specifically, normally, an upper end wall or a lower end wall of a housing is formed as a separate member from a housing main portion. In this case, it is necessary to attach the drawing member to the housing such that the drawing member is set inside the housing to allow the guiding projections to engage the guiding grooves, and then the upper end wall or the lower end wall is attached to the housing main portion. However, as described before, in the invention, since the first and second guiding grooves are open at the front end of the housing or at the rear end of the drawing member, the drawing member can be assembled to the housing such that the drawing member is inserted into the housing from the front end of the housing having the upper end wall and the lower end wall, which are integrally formed, by inserting the guiding projections from both opening ends of the first and second guiding grooves. Thus, the withdrawal mechanism can be extremely simply structured.

As described above, according to the withdrawal mechanism of the invention, it is possible to draw the drawing member by sliding it on one side, and also, the drawn drawing member can be stably held. Moreover, with the less number of parts, its assembling work can be easily carried out, which results in reduction of the cost.

Therefore, in the cup-holder unit using the withdrawal mechanism of the invention, in order to avoid the shift lever and arm rest which become obstacles or consider the using condition of the user, the holder member can be drawn in a swung or tilted state, and also, the shaking and wobbling does not occur to thereby stably hold a cup or the like thereon. Moreover, with the less number of parts, the cup-holder unit can be effectively assembled and produced at a low cost.

DETAILED DESCRIPTION OF PREFERRED EMBODIMENTS

Hereunder, embodiments of the present invention will be described with reference to the accompanying drawings.

FIGS. 1(A) to 3(B) are drawings showing a cup-holder unit using a withdrawal mechanism of an embodiment according to the present invention. The cup-holder unit includes a housing 1, a holder member, i.e. drawing member, 2 slidably housed in the housing 1, and a bottom surface supporting arm 3.

Figure 4A:
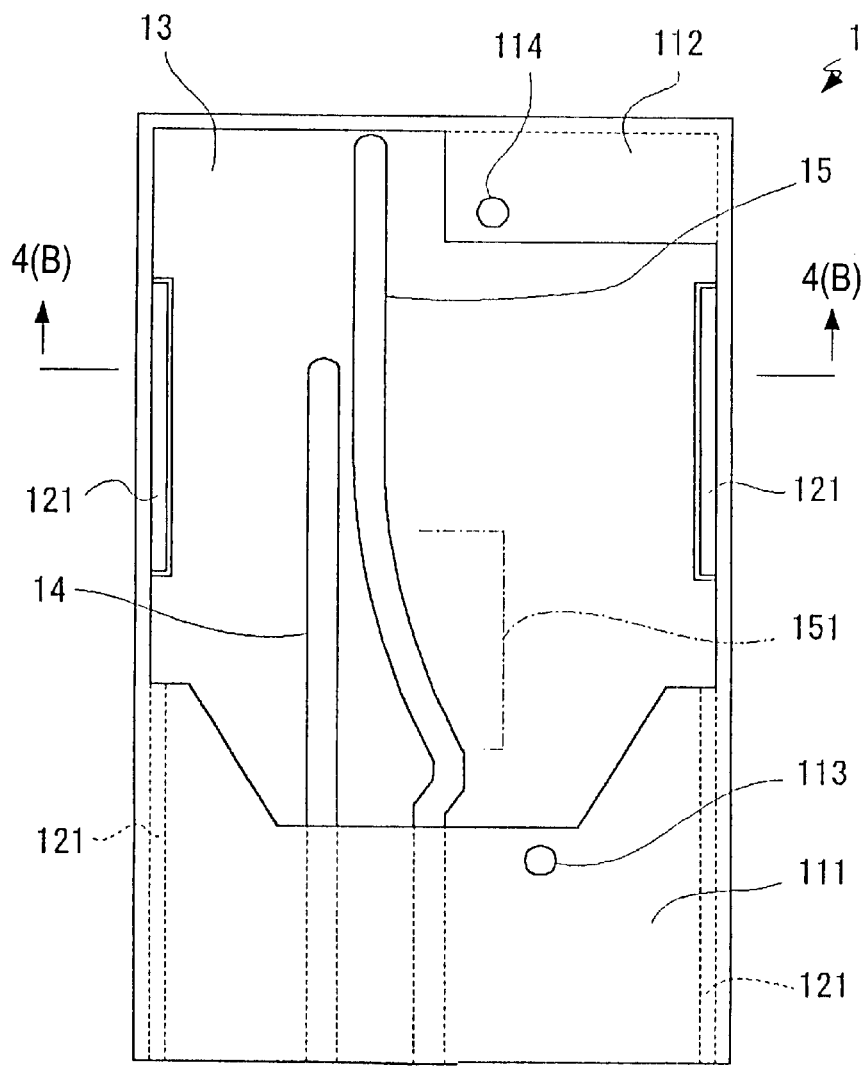
FIG. 4(A) is a plan view of a housing for constituting the cup-holder unit.
Figure 4B:
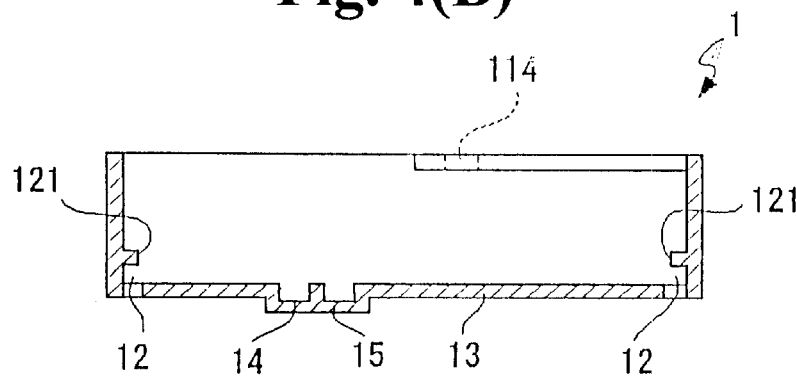
FIG. 4(B) is a sectional view taken along line 4(B)—4(B) in FIG. 4(A)

As shown in FIGS. 4(A) and 4(B), the housing 1 is substantially a box-shape case, a forward end surface of which is open, and an upper end wall thereof is divided into an upper wall front portion 111 notched in a trapezoidal shape at a rear end side central portion and provided at the front portion of the housing 1, and an upper wall rear portion 112 provided at the rear end portion on one side of the housing 1. The upper surface of the housing 1 is open from the central portion to the rear end on the other side.

The housing 1 is provided with a first loose-locking hole 113 on one side in the rear end portion of the upper wall front portion 111, and a second loose-locking hole 114 on the other side in the upper wall rear portion 112. Also, the housing 1 is provided with rail projections 121 on the inner surfaces of both side walls at a front portion and a slightly rear portion from the central portion, and sliding grooves 12 are formed between the rail projections 121 and lower end wall 13, respectively.

Further, a first guiding groove 14 and a second guiding groove 15 are formed side by side along the front-and-rear directions on an inner surface of the lower end wall 13 of the housing 1. The first guiding groove 14 linearly extends from a slightly forward portion of the rear end to the front end of the housing 1 and is open at the front end thereof. The second guiding groove 15 extends from the rear end portion to the front end of the housing 1. The second guiding groove 15 is provided with a portion inclined to one side, i.e. to the side opposite to the first guiding groove 14, at the middle portion thereof to form an inclined rear portion 151, and a portion inclined again to the other side to thereby form a small mountain shape, wherein the groove 15 thereafter linearly extends to the front end of the housing 1 to open at the front end.

Figure 5A:
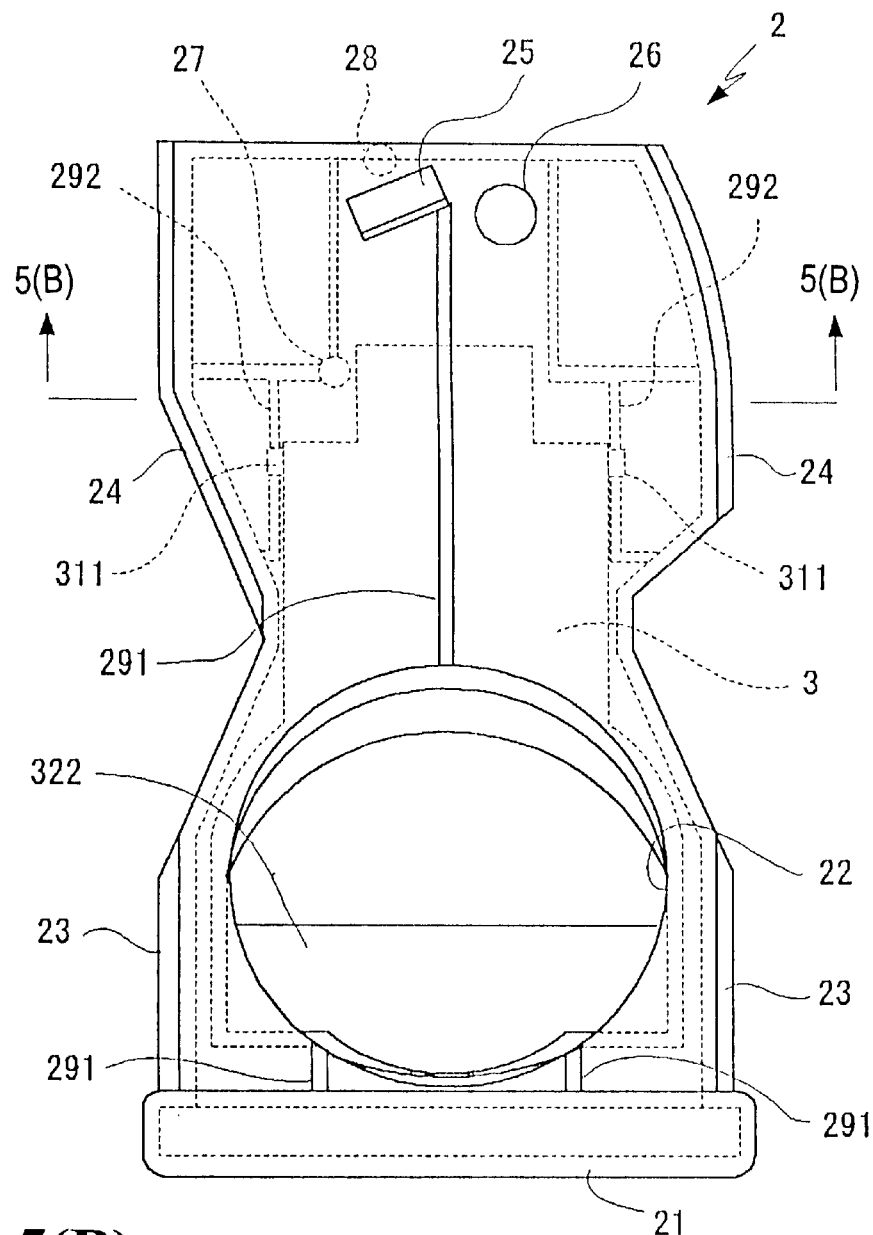
FIG. 5(A) is a plan view of the holder member, i.e. drawing member, for constituting the cup-holder unit.
Figure 5B:
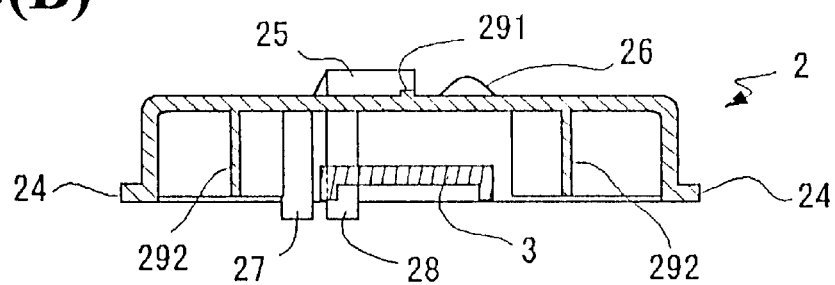
FIG. 5(B) is a sectional view taken along line 5(B)—5(B) in FIG. 5(A)

As shown in FIGS. 5(A) and 5(B), the holder member 2 is provided with a holding portion 21 at a front end portion, i.e. a lower side end in FIG. 5(A), and a perfect-round-shape holding hole 22 at the front portion thereof. The holder member 2 has a narrowed portion by being notched inward from both sides at a middle portion in the longitudinal direction thereof.

Both side surfaces of the holder member 2 are provided with sliding projections 23, 24 in the front portion and the rear portion thereof, respectively, and one of the sliding projections 24 formed on both sides of the rear portion is curved in a shape of a circular arc and the other is bent sharply along the narrowed portion.

Also, an engaging projection 25 with a right-angled triangle in section is provided in an inclined state on a rear end portion of an upper surface of the holder member 2. A loose-locking projection 26 of a conical shape curved in a spherical shape at a top thereof is formed adjacent to the engaging projection 25. Further, the holder member 2 includes a first guiding projection 27, and a second guiding projection 28 formed at the rear portion and rear end of a lower surface of the holder member 2, respectively.

Incidentally, in FIGS. 5(A) and 5(B), reference numeral 291 represents a reinforcing rib formed on an upper surface side of the holder member 2, and reference numeral 292 represents a reinforcing rib formed on a lower surface side of the holder member 2.

Figure 6A:
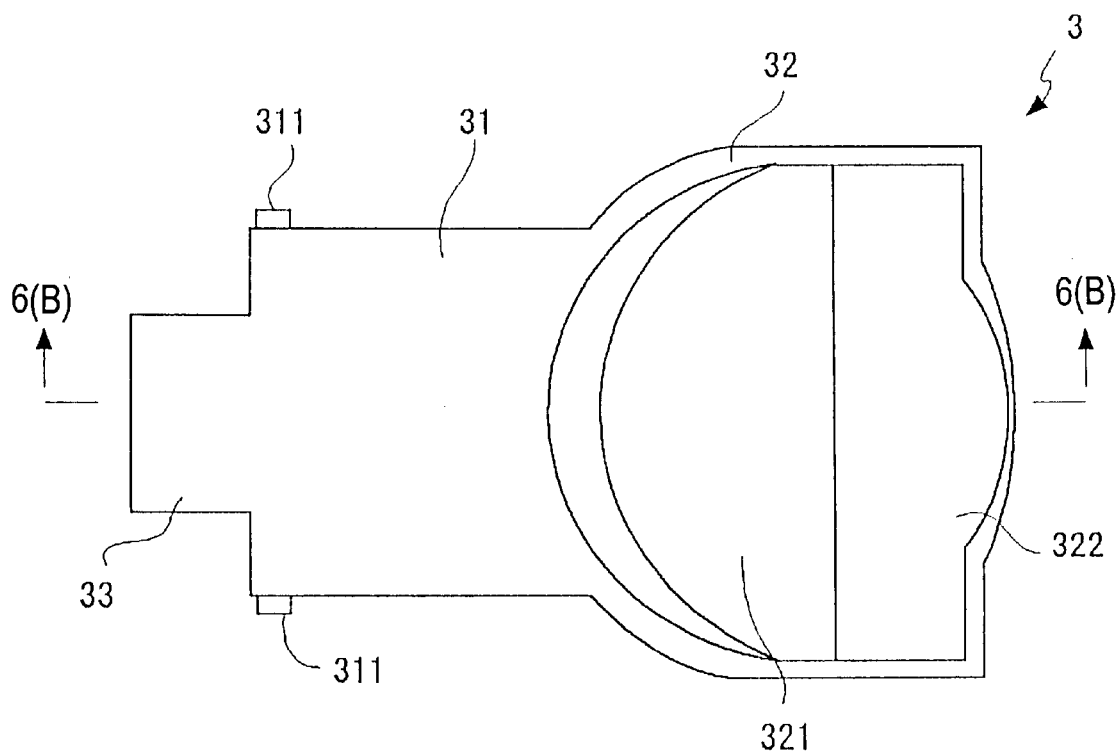
FIG. 6(A) is a plan view of a bottom supporting arm for constituting the cup-holder unit.
Figure 6B:
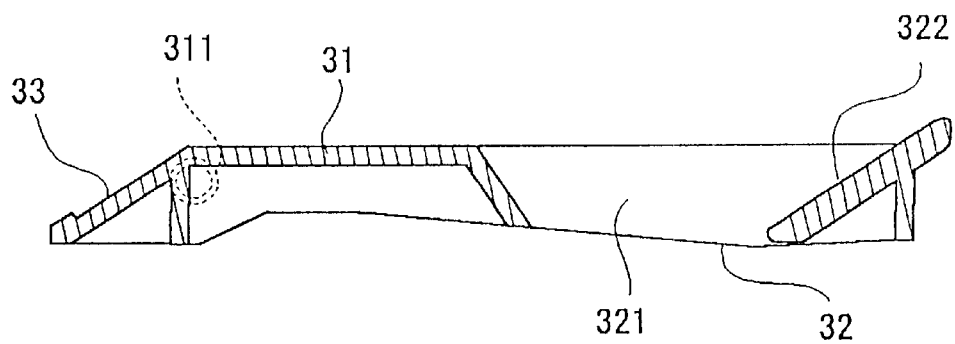
FIG. 6(B) is a sectional view taken along line 6(B)—6(B) in FIG. 6(A)
Figure 7:
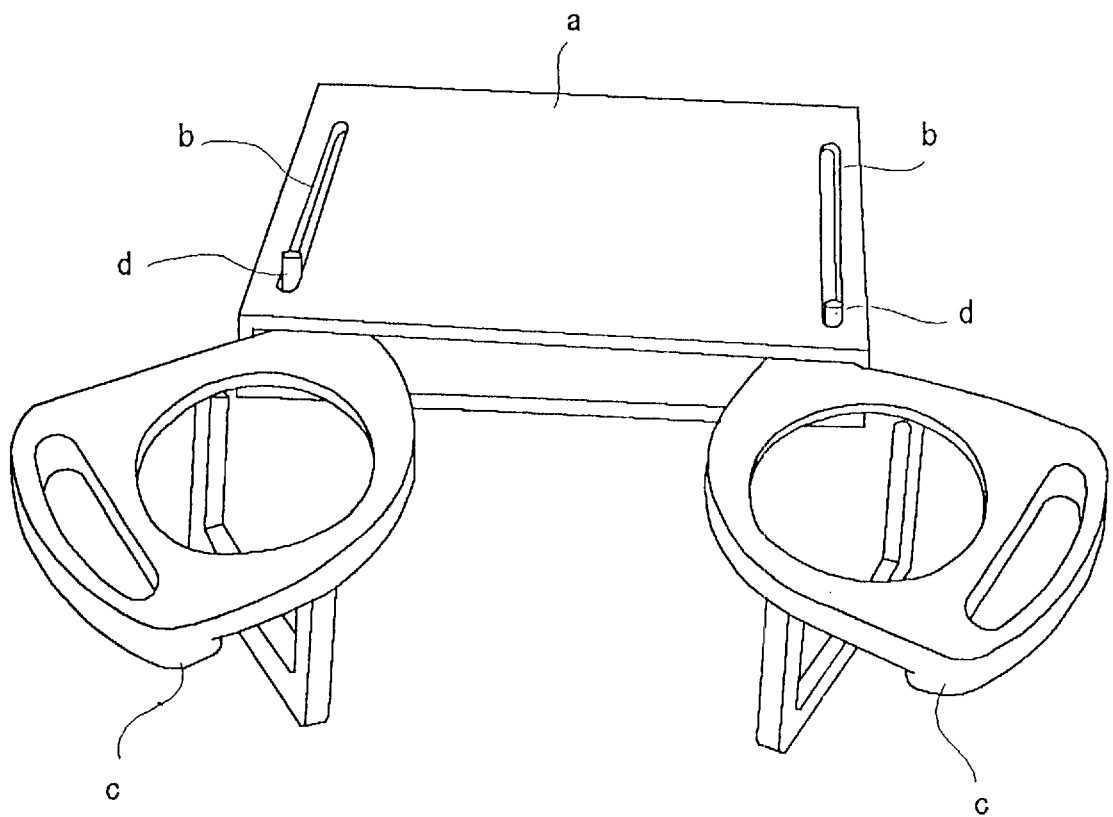
FIG. 7 is a perspective view of an example of a conventional cup-holder unit.

Next, as shown in FIGS. 6(A) and 6(B), the bottom surface supporting arm 3 is formed such that a widened portion 32 is integrally formed in the front end, i.e. right side end in FIG. 6(A), of a square main portion 31. A substantially semi-circular through hole 321 is formed on the widened portion 32, and a rotary engaging member 33 is integrally formed to extend rearward while inclining downward from the central portion of the rear end of the main portion 31.

In the bottom surface supporting arm 3, shaft projections 311 project from both side surfaces of the rear end portion of the main portion 31, respectively, and a linear front-end wall of the through hole 321 is inclined inward to form a bottom receiving surface 322.

As shown in FIG. 5(A), the bottom surface supporting arm 3 are is attached at the shaft projections 311 to the reinforcing ribs 292 provided at the lower surface side of the holder member 2 to pivot relative to the lower surface of the holder member 2.

As shown in FIGS. 1(A) to 3(B), the holder member 2 provided with the bottom surface supporting arm 3 is slidably received in the housing 1 to be slidable in the front-and-rear directions thereof. In this case, the first and second guiding projections 27, 28 of the holder member 2 are inserted into the first and second guiding grooves 14, 15 of the housing 1, and also, the sliding projections 23, 24 of the holder member 2 are inserted into the sliding grooves 12 of the housing 1. Also, the engaging projection 25 of the holder member 2 is positioned in the upper surface opening formed in the rear portion behind the upper wall front portion 111 of the housing 1, and the forward end portion thereof projects upward from the upper end surface of the housing 1.

Next, operations of the cup-holder unit will be explained.

The cup-holder unit is installed in the automobile by assembling the housing 1 inside an installment panel or the like of the automobile. Normally, as shown in FIGS. 1(A) to 1(C), the holder member, i.e. drawing member, 2 is received in the housing 1, and when used, as shown in FIGS. 2(A) to 3(B), the holder member 2 is drawn from the housing 1 to thereby hold a cup h of a canned beverage or the like on the holder member 2.

Figure 1A:
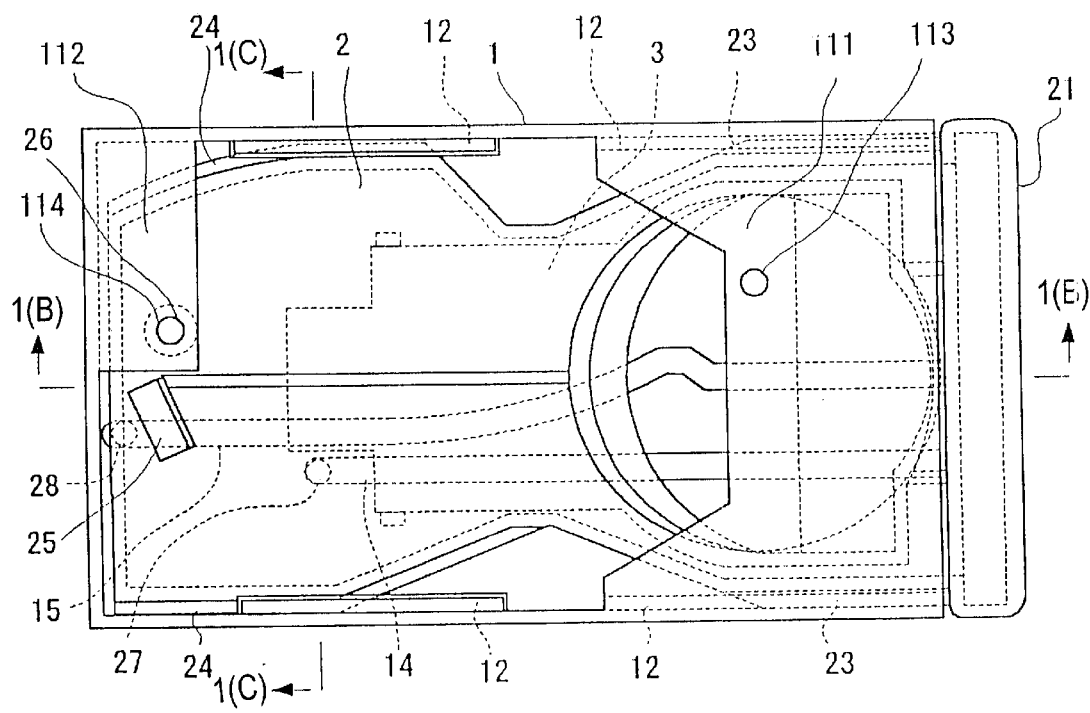
FIG. 1(A) is a plan view of a cup-holder unit having a withdrawal mechanism of an embodiment according to the present invention.
Figure 1B:
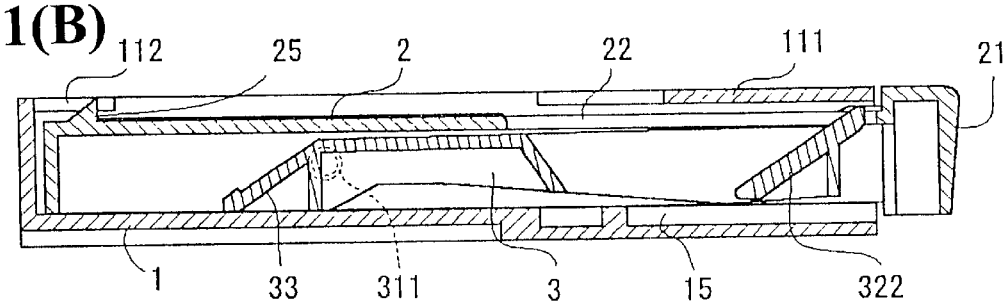
FIG. 1(B) is a sectional view taken along line 1(B)—1(B) in FIG. 1(A)
Figure 1C:
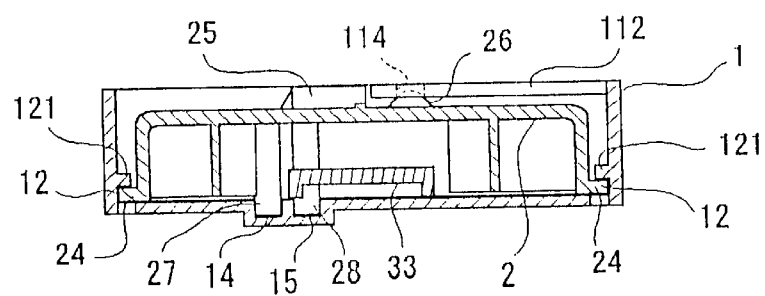
FIG. 1(C) is a sectional view taken along line 1(C)—1(C) in FIG. 1(A)

More specifically, as shown in FIGS. 1(A) to 1(C), normally, almost the whole holder member 2 is received in the housing 1, and the holding portion 21 of the holder member 2 closes the front end, i.e. opening, of the housing 1. At this time, the loose-locking projection 26 of the holder member 2 is fitted into the second loose-locking hole 114 provided in the upper wall rear portion 112 of the housing 1 to thereby take a gently or loosely locked state. Also, the bottom surface supporting arm 3 is in an upper rotating limit state and closely contacts the lower surface of the holder member 2 to become a folded condition.

From the above state, when the cup holder is used, the holding portion 21 is held by a hand and is drawn from the front end opening surface of the housing 1. Thus, the upper wall rear portion 112 of the housing 1 is bent upward to allow the loose-locking projection 26 to be pulled out of the second loose-locking hole 114, so that the gentle locked state is released, and the holder member 2 slide in the forward direction in the housing 1. At this time, the first and second guiding projections 27, 28 of the holder member 2 slide in the first and second guiding grooves 14, 15 of the housing 1, respectively, and both the sliding projections 23, 24 of the holder member 2 slide in the sliding grooves 12 of the housing 1.

Figure 2A:
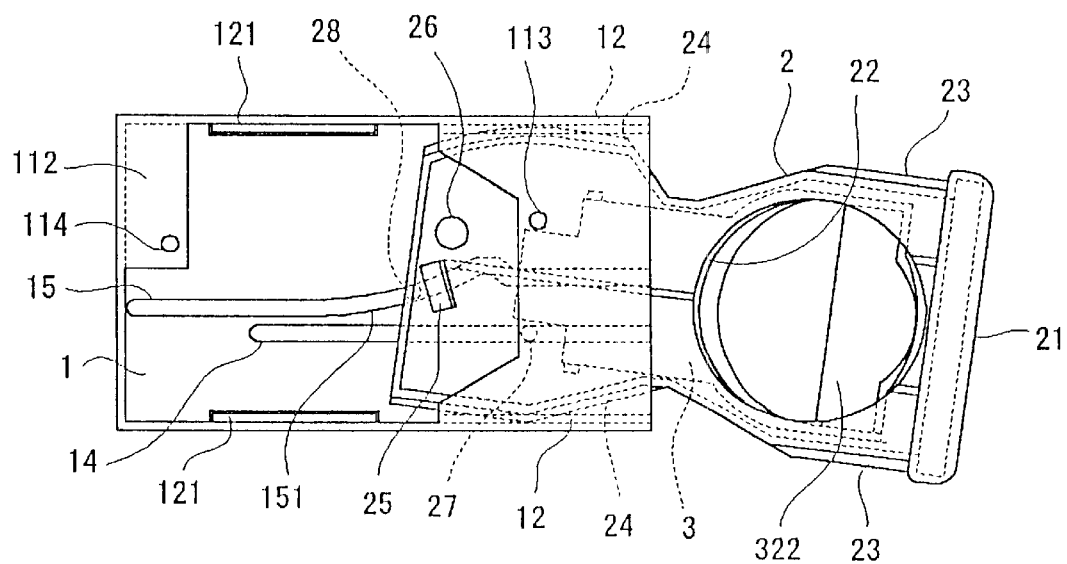
FIG. 2(A) is a plan view of the cup-holder unit, wherein a holder member, i.e. drawing member, is drawn to a middle part.
Figure 2B:
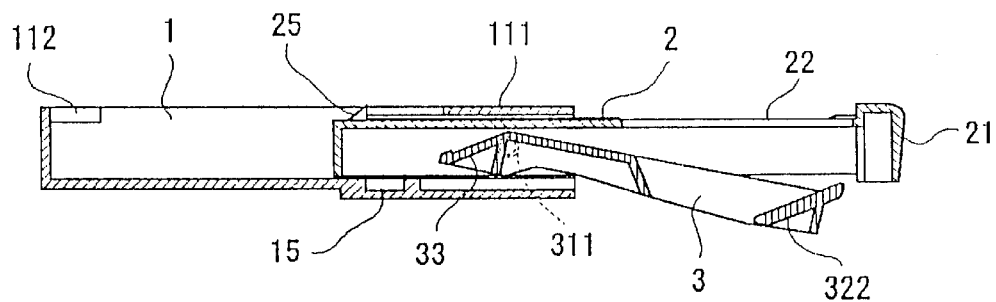
FIG. 2(B) is a sectional view thereof.

As shown in FIGS. 2(A) and 2(B), when the second guiding projection 28 of the holder member 2 enters the inclined portion 151 of the second guiding groove 15, the second guiding projection 28 is moved forward while inclining to one side along the inclined portion 151, so that the holder member 2 moves forward while rotating around the first guiding projection 27. At this time, the sliding projections 24 provided on the rear portion of the holder member 2 are transferred to the sliding grooves 12 disposed on the froward side of the housing 1 to slide therein. Further, the bottom surface supporting arm 3 is rotated downward by its own weight according to the projecting movement from the front end surface of the housing 1.

Figure 3A:
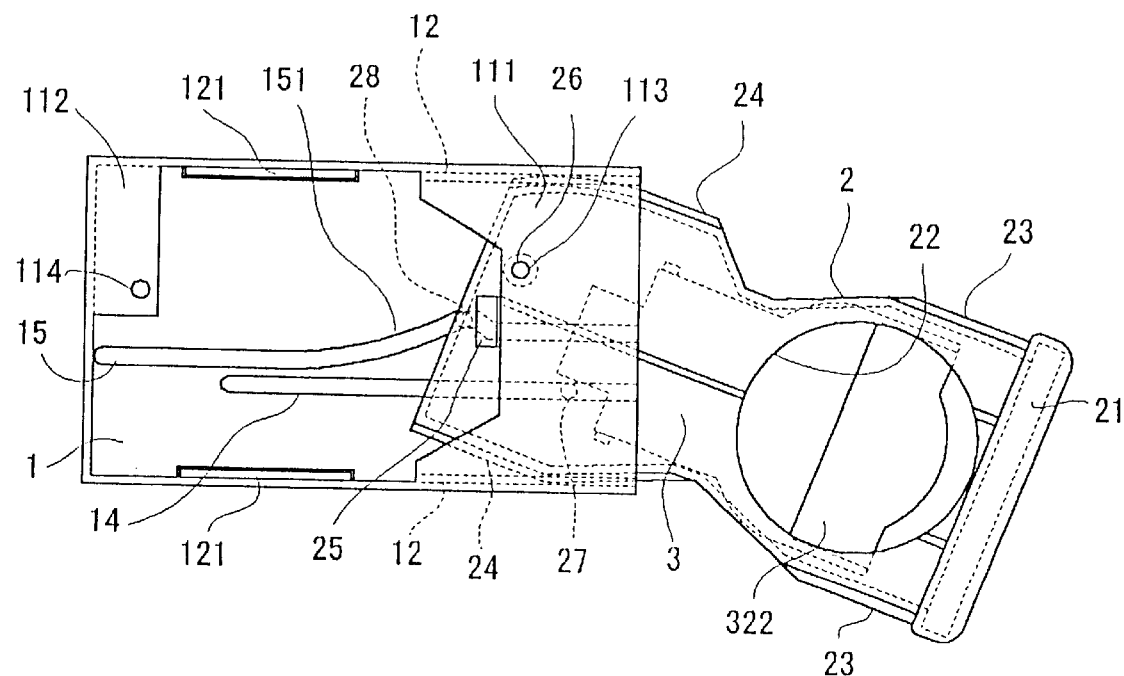
FIG. 3(A) is a plan view of the cup-holder unit, wherein the holder member, i.e. drawing member, is drawn for use.
Figure 3B:
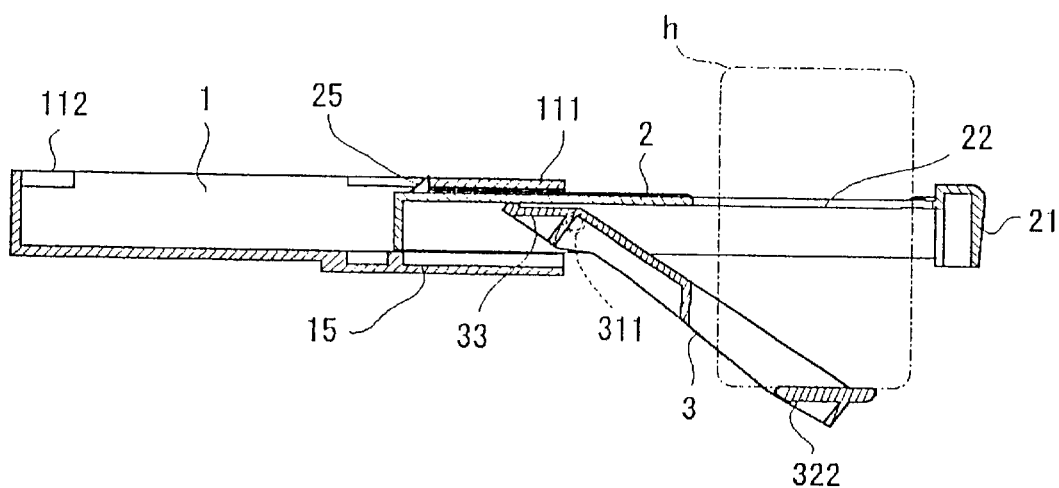
FIG. 3(B) is a sectional view thereof.

As shown in FIGS. 3(A) and 3(B), when the second guiding projection 28 of the holder member 2 arrives at a top portion of the inclined portion 151, the engaging projection 25 abuts against the upper wall front portion 111 of the housing 1 to thereby restrict the forward movement thereof, and also, the loose-locking projection 26 enters under the upper wall front portion 111 to fit into the first loose-locking hole 113 to thereby lock loosely.

At this time, the holder member 2 projects from the front end of the housing 1 in a state where the holder member 2 swings or inclines to one side by a predetermined angle corresponding to the inclination to the other side by the second guiding projection 28 guided by the inclined portion 151 of the guiding groove 15, so that the holding hole 22 completely projects forward from the housing 1. Also, the bottom surface supporting arm 3 is further rotated downward to allow the rotary engaging member 33 to abut against the lower surface of the holder member 2, and holds a state where the bottom surface supporting arm 3 is rotated downward by a predetermined angle.

Under the state, as shown in FIG. 3(B), the cup h of the canned beverage or the like is placed on the bottom receiving surface 322 of the bottom surface supporting arm 3 through the supporting hole 22 of the holder member 2.

Since the inclined portion 151 of the second guiding groove 15 is formed once to be inclined to one side and then inclined to the other side through the top portion having the mounting shape, in order to completely remove the holder member 2 from the housing 1, the holder member 2 once rotated to one side is again rotated to the other side by a predetermined angle, and further while holding the rotating angle, the holder member 2 is drawn out on this side. Such a complicated movement of the holder member 2 prevents the holder member 2 from being erroneously drawn out at the time of use. Thus, the present invention can be used safely.

In case the holder member 2 is again retained in the housing 1, the holder member 2 is pushed into the housing 1. Thus, the upper wall front portion 111 of the housing 1 is bent upward; the loose locking projection 26 is extracted from the first loose locking hole 113 to release the loose locking condition; the second guiding projection 28 is guided by the inclined portion 151 of the second guiding groove 15; the holder member 2 is moved rearward while rotating in a direction opposite to that at the time of the drawing thereof; when the loose locking projection 26 abuts against the upper wall rear portion 112 of the housing 1, the holder member 2 is further strongly pushed to enter under the upper wall rear portion 112; the loose locking projection 26 fits the second loose locking hole 114 to be loosely locked and is returned to the original state as shown in FIGS. 1(A) to 1(C).

As described above, the cup holder according to the present invention is structured such that the first guiding projection 27 and the second guiding projection 28 formed on the holder member 2 are slidably inserted into the linearly formed first guiding groove 14 and the second guiding groove 15 having the inclined portion 151 provided to the housing 1. When the holder member 2 is drawn from the housing 1, the first and second guiding projections 27, 28 are slidably moved in the first and second guiding grooves 14, 15. When the second guiding projection 28 is guided along the inclined portion 151 of the second guiding groove 15, the holder member 2 is rotated around the first guiding projection 27 by a predetermined angle, and the holder member 2 is drawn from the front end of the housing 1 in a state where the holder member 2 is rotated by a predetermined rotating angle.

Therefore, in the cup-holder unit of the present embodiment, the swinging angle of the holder member 2 is controlled by an engaging point between the first guiding projection 27 and the first guiding groove 14 and an engaging point between the second guiding projection 28 and the second guiding groove 15. Thus, the swinging angle of the holder member 2 drawn out of the front end of the housing 1 is stably held at a predetermined angle, and no shaking nor wobbling takes place.

Also, in the present embodiment, since the sliding grooves 12 are formed along inner surfaces of both side walls of the housing 1 in the front-and-rear directions thereof and the sliding projections 23, 24 to be slidably inserted into the sliding grooves 12 are provided on both side surfaces of the holder member 2, vertical wobbling of the holder member 2 can be positively prevented to thereby further improve the stability in the using state where the holder member 2 is drawn out from the housing 1. Also, the curved portion and inclined portion corresponding to the rotating movements of the holder member 2 are provided at the sliding projections 24 disposed on the rear portion of the holder member 2, and while the holder member 2 is being completely drawn out from its housed condition and while the holder member is being completely housed from its drawn condition, at least a part of the sliding projections 23, 24 is always inserted into the sliding grooves 12, so that no vertical wobbling takes place when the holder member 2 is drawn or housed, and extremely stable drawing operation and housing operation of the holder member 2 can be carried out.

Figure 8A:
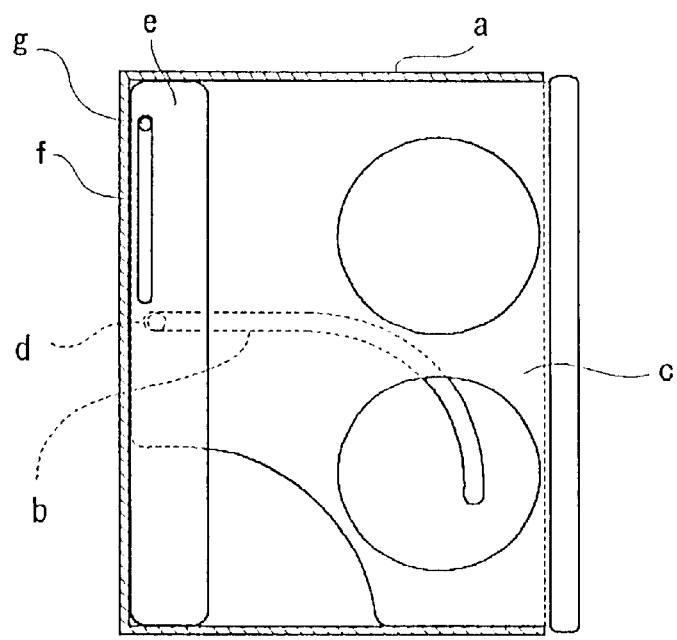
FIG. 8(A) is a plan view of another example of a conventional cup-holder unit showing a housed state, i.e. non-use state.
Figure 8B:
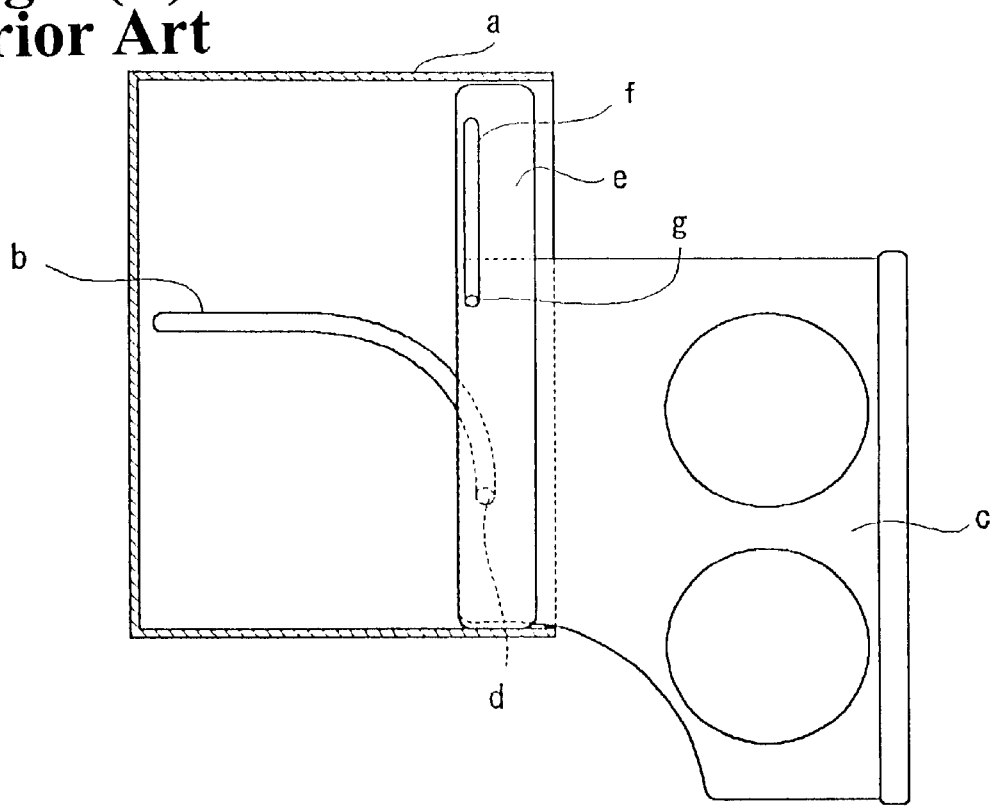
FIG. 8(B) is a plan view of the same showing a drawn state, i.e. using state.

Further, in the cup-holder unit of the present embodiment, the housing 1 is provided only with the first and second guiding grooves 14, 15 and the holder member 2 is provided only with the first and second guiding projections 27, 28. It is not required to provide the sliding guide member e in the cup holder as shown in FIGS. 8(A) and 8(B) nor a locking mechanism for locking the holder member 2 at a predetermined swinging angle. Thus, the cup holder of the present embodiment can be structured with less number of parts. Moreover, the cup holder of the embodiment can be easily assembled with a simple work such that the holder member 2 is set in the housing 1 so that the first and second guiding grooves 14, 15 of the housing 1 are engaged with the first and second guiding projections 27, 28 of the holder member 2 to thereby reduce the working steps and assembly effectively. Thus, the production cost can be effectively reduced.

In this case, in the present embodiment, since the first and second guiding grooves 14, 15 are formed to open at the front end of the housing 1, it is easily carried out to assemble the holder member 2 to the housing 1. Thus, the assembly work can be done with an extremely good workability.

More specifically, in the cup-holder unit of the present embodiment, the holder member 2 is pressed against the housing 1 from the front end thereof so that the first and second guiding projections 27, 28 are inserted into the first and second guiding grooves 14, 15 through the opening edges thereof to thereby assemble the holder member 2 to the housing 1. Thus, a withdrawal mechanism can be structured extremely simply.

As described above, in the cup-holder unit of the embodiment, in order to avoid the obstacles, such as the shift lever and arm rest, and consider the user's using conditions, the holder member 2 can be drawn in a swung or tilted state and can stably hold a cup or the like thereon without causing shaking and wobbling. Moreover, with less number of parts, the cup-holder unit can be assembled effectively and produced at a low cost.

Incidentally, the withdrawal mechanism and the cup-holder unit using the same of the invention are not limited to the above described embodiments. For example, in the above embodiment, the housing 1 is provided with the first and second guiding grooves 14, 15 and the holder member 2 is provided with the first and second guiding projections 27, 28. However, the holder member 2 may be provided with the first and second guiding grooves and the housing 1 may be provided with the first and second guiding projections. Also, a locking mechanism for locking the holder member 2 when it is used or housed, or a holding mechanism for holding a cup or the like provided to the holder member 2 can be suitably changed. Also, other structures may be suitably changed provided that they do not depart from the spirit and purport of the invention. Further, although the withdrawal mechanism of the invention can be suitably used for the drawer-type cup holder, it is not limited thereto. The withdrawal mechanism may be applied to any system which requires a drawer-type mechanism, such as a tray and glove compartment.

As described above, according to the withdrawal mechanism and the cup-holder unit using the same of the invention, a drawing member, such as a holder for holding a cup or the like, can be drawn by sliding to one side; the drawn drawing member can be held stably; with a less number of parts, the assembling work can be easily carried out; and the cup holder can be produced at a low cost.

While the invention has been explained with reference to the specific embodiments of the invention, the explanation is illustrative and the invention is limited only by the appended claims.

What is claimed is:

1. A Withdrawal mechanism comprising:
   a box-type housing having a front opening at a front side;
   a drawing member housed in the housing to be slidably moved in front-and-rear directions of the housing, said drawing member, when it is pulled forward, projecting forward through the front opening of the housing;
   a first guiding groove formed in one of the housing and the drawing member;
   a second guiding groove formed in one of the housing and the drawing member near the first guide groove and having an inclined portion inclined to one side of the housing at at least a portion thereof;
   a first guiding projection formed on the other of the housing and the drawing member and slidably inserted into the first guiding groove; and
   a second guiding projection formed on the other of the housing and the drawing member at a predetermined fixed distance away from the first guiding projection in the front-and-rear directions and slidably inserted into the second guiding groove, said first guiding groove and said second guiding groove being disposed side by side in the front-and-rear directions so that when the drawing member is drawn from the housing, the first and second guiding projections slide in the first and second guiding grooves, and the drawing member is drawn while the drawing member rotates around the first guiding projection to tilt relative to the housing when the second guiding projection slides through the inclined portion of the second guiding groove, said drawing member Projecting from the front opening of the housing in an inclined state by a predetermined angle.

2. A withdrawal mechanism as claimed in claim 1, further comprising sliding grooves formed on inner surfaces of two side walls of the housing or two side surfaces of the drawing member in the front-and-rear directions, respectively, and sliding projections formed on the two side surfaces of the drawing member or the inner surfaces of the two side walls and slidably inserted into the sliding grooves, at least one said sliding grooves or sliding projections having at least partly a curved portion or inclined portion corresponding to a rotating movement of the drawing member.

3. A withdrawal mechanism as claimed in claim 1, wherein said first and second guiding grooves are open at the front side of the housing or a rear end of the drawing member.

4. A withdrawal mechanism as claimed in claim 1, wherein said first and second guiding grooves are formed on an inner surface of a bottom wall of the housing, and said first and second guiding projections are formed to project from a lower surface of the drawing member.

5. A withdrawal mechanism as claimed in claim 4, wherein said inclined portion is formed in the second guide groove near the front side of the housing to allow the drawing member to incline relative to the housing.

6. A withdrawal mechanism as claimed in claim 5, further comprising stopping means provided between the housing and the drawing member for allowing the drawing member to stop at a retracted position and a drawn position.

7. A cup-holder unit comprising said box-type housing and said drawing member as claimed in claim 1, said drawing member having a holder portion for holding a container so that when the drawing member is held in the housing, the holder portion is retained inside the housing, and when the drawing member is slid forward from the housing, the holder portion projects forward from the housing.

8. A cup-holder unit as claimed in claim 7, wherein said drawing member further includes a support member having one end pivotally attached thereto and the other end located under the holder portion, said support member being located close to the drawing member when the drawing member is held in the housing and the other end is moved away from the drawing member when the drawing member is drawn from the housing.

9. A withdrawal mechanism as claimed in claim 1, wherein said drawing member includes a front portion and a rear portion, said rear portion being urged laterally by the inclined portion and the second guiding projection to laterally tilt the front portion relative to the housing around the first guiding projection.

10. A withdrawal mechanism as claimed in claim 9, wherein said second guiding projection is located at a rear end of the drawing member, and the first guiding projection is located away from the second guiding projection to the front portion.

* * * * *